July 21, 1936.  E. FRANKIGNOUL  2,048,252
PREPARATORY CAISSON
Filed Dec. 15, 1933  3 Sheets-Sheet 1
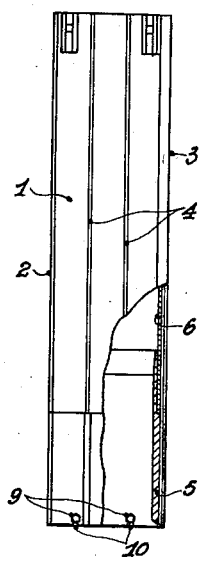
FIG.1.
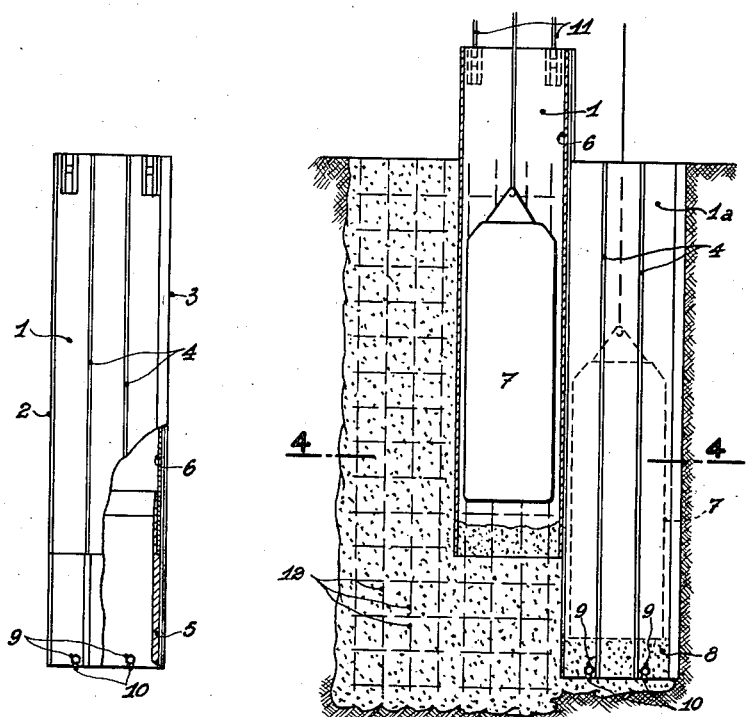
FIG.3.
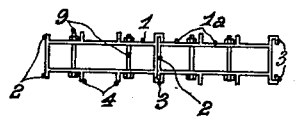
FIG.2.
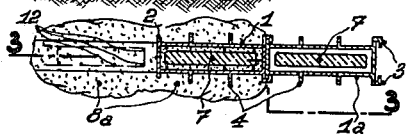
FIG.4.
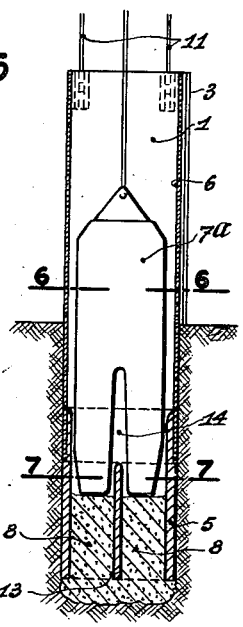
FIG.5
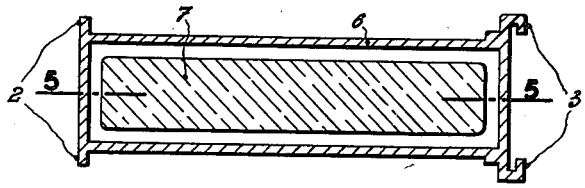
FIG.6.
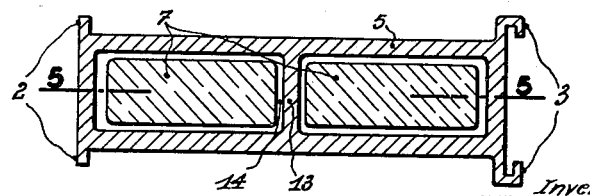
FIG.7.
Inventor
E. Frankignoul
by
atty.

July 21, 1936.　　　E. FRANKIGNOUL　　　2,048,252
PREPARATORY CAISSON
Filed Dec. 15, 1933　　　3 Sheets-Sheet 2
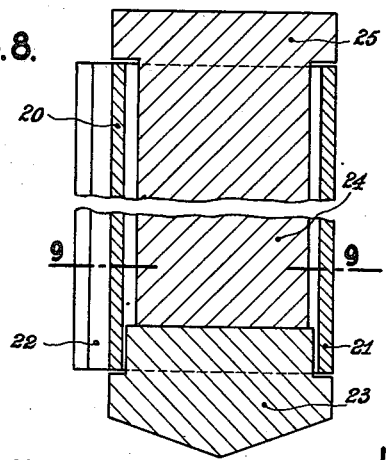
FIG. 8.
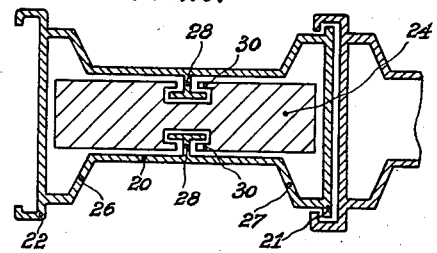
FIG. 10.
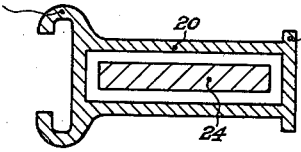
FIG. 9.
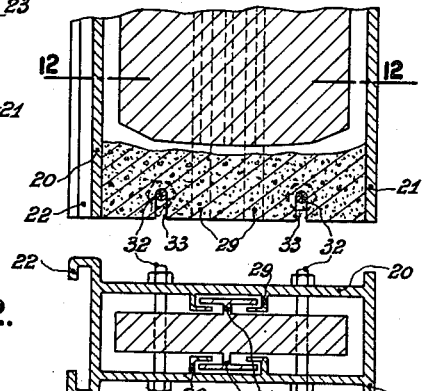
FIG. 11.
FIG. 12.
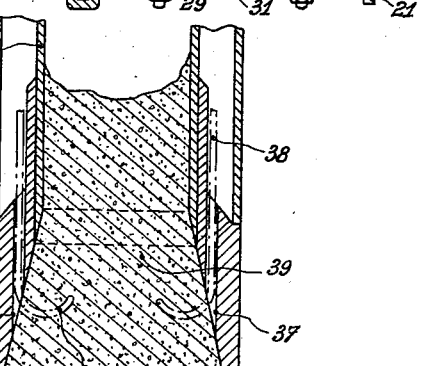
FIG. 14.
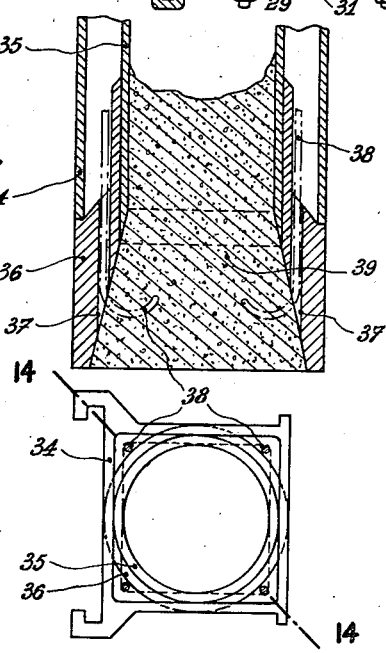
FIG. 13.
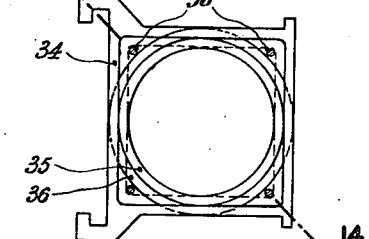
Inventor
E. Frankignoul
by
atty.

July 21, 1936. E. FRANKIGNOUL 2,048,252
PREPARATORY CAISSON
Filed Dec. 15, 1933 3 Sheets-Sheet 3

Inventor
E. Frankignoul
by
atty.

Patented July 21, 1936

2,048,252

UNITED STATES PATENT OFFICE 2,048,252

PREPARATORY CAISSON

Edgard Frankignoul, Brussels, Belgium, assignor to Compagnie Internationale des Pieux Armes Frankignoul, Société Anonyme, Liege, Belgium Application December 15, 1933, Serial No. 702,631
In Belgium July 20, 1933

6 Claims. (Cl. 61—78)

My invention relates to processes and devices for constructing sheet piles of reinforced or non-reinforced concrete, said sheet piles being moulded in the ground by means of hollow metal forms or tubes adapted to be driven successively and in jointed relation to each other into the ground to the desired depth and to be withdrawn subsequently therefrom, said sheet piles being designed for the construction of retaining walls, quay walls, protection walls for river banks, dams, etc.

My invention more particularly views the construction of a continuous, water tight and strongly anchored sheet piling.

To this end, I provide driving hollow metal forms successively and in jointed relation to each other into the ground to the desired depth, either by ramming directly with a monkey upon a fluid tight plug of concrete, formed in the lower end of the tube by the first blows of the monkey, or by ramming with the monkey upon a core supported simultaneously by the upper edge of the tube and the lost sinking point of metal or concrete, or on a tightening plug formed in the lower part of the tube, so as to prevent any water or mud from penetrating into the tube. Further, the said plug is expelled so as to form an enlarged base upon which the body of the sheet pile is being formed, which is obtained by filling up the said hollow form or tube with concrete and by withdrawing the tube gradually.

In order to prevent damaging of the lower end of the tube by the effect of the blows of the monkey, I may make this end of cast steel and reinforce it conveniently by providing bolts, or the like, adapted to engage notches in the tube having their open side directed downwardly, so as to keep the walls of the said tube conveniently spaced apart during ramming and to be expelled together with said plug.

In order to more effectively prevent damaging of the tube and secure particularly advantageous conditions for the building up of the sinking plug, my invention further provides the use of preparatory forms or tubes formed by an outer tube of square cross section connected to an inner tube of circular section coextensive with the said outer tube along the whole or a part of the length thereof, said circular tube being adapted to receive the concrete plug acting as a sinking point.

If desired, both the outer and inner tubes may rest upon a lost sinking point, above which the sinking plug is formed.

This arrangement makes it possible to provide reinforcing bars in the spaces comprised between the outer and inner tubes, the lower ends of such bars being anchored in the plug or in the sinking point adapted to be left in the ground.

Finally, my invention makes it possible to prevent the formation of lines of less resistance along the joints of the sheet piling, owing to the use of preparatory forms provided with guides having their male and female members of much greater width than that of the tube proper, so as to form, during concreting, a longitudinal bead or flange along the jointing seam of the sheet piles, which bead or flange is effective in highly increasing the tightness and the resistance of the sheet piling. The same result may be obtained by the use of lining tubes widened at both ends.

However, in some cases it may be found necessary to construct a sheet piling having smooth walls. To this end my invention provides lining tubes which are mutually guided by means of special guides provided in the thickness of the body of the preparatory tube or form.

By simple way of example, various ways of carrying the invention into effect will be hereinafter described with reference to the accompanying diagrammatical drawings in which:

Fig. 1 is a front elevation, partly in section, of one embodiment of a lining tube according to the invention.

Fig. 2 is a plan view of two preparatory tubes with their guides engaged in each other.

Fig. 3 is a section on line 3—3 of Fig. 4, showing various stages of construction of sheet piles.

Fig. 4 is a section on line 4—4 of Fig. 3.

Fig. 5 is a sectional view of a modification of the preparatory form according to the present invention.

Figs. 6 and 7 are sectional views drawn to a larger scale, on lines 6—6 and 7—7, respectively, of Fig. 5.

Fig. 8 illustrates the arrangement for driving a lining or preparatory tube or form by means of a core and in combination with a lost sinking point.

Fig. 9 is a section on line 9—9 of Fig. 8.

Figs. 10 and 11 are tranverse and longitudinal sections respectively of two modifications of a lining tube having internally arranged guide members for the core.

Fig. 12 is a section on line 12—12 of Fig. 11.

Figure 15:
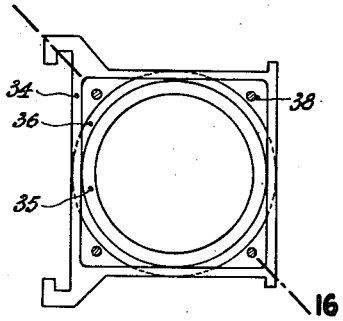
Figure 17:
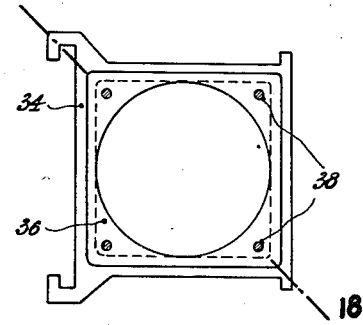

Figs. 13, 15, and 17 are plan views illustrating three further modifications of a preparatory tube.

Figure 16:
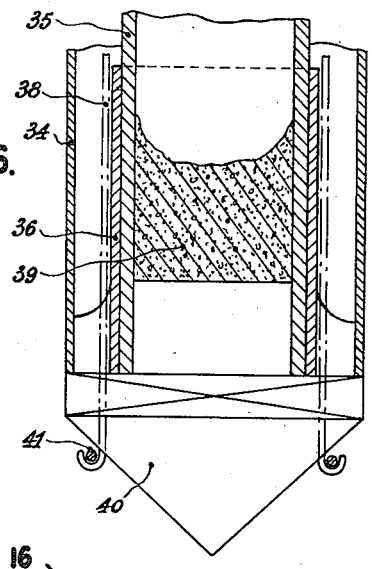
Figure 18:
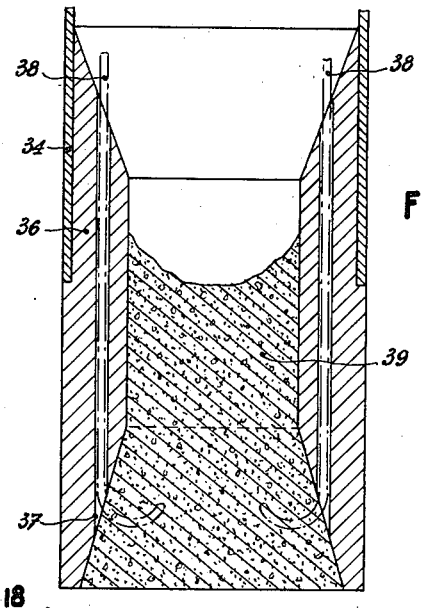
Figure 19:
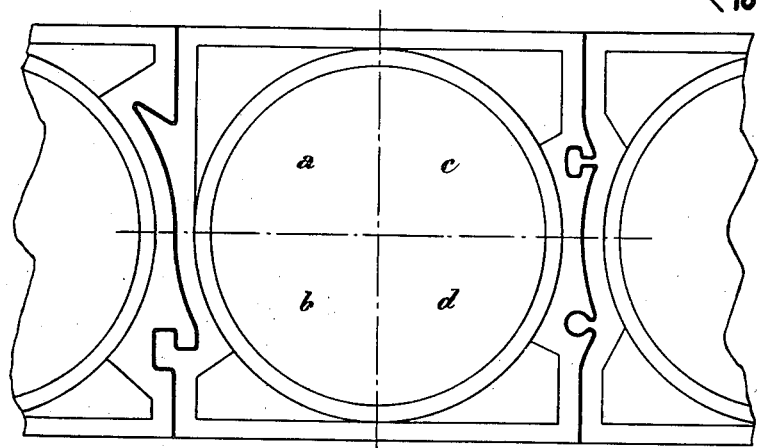

Figs. 14, 16, and 18 are sections on lines 14—14 of Fig. 13, 16—16 of Fig. 15, and 18—18 of Fig. 17, respectively, and Fig. 19 illustrates four embodiments of guide members for lining tubes adapted for the construction of sheet pilings having smooth walls.

As shown in Figs. 1 to 4, the hollow form or lining tube 1, preferably of rectangular section, is provided with male and female guide members 2 and 3 respectively, designed to secure mutual guidance of the lining tubes or forms during driving, said tubes being further provided with a number of longitudinal ribs 4 effective in reinforcing the walls of the tube.

The tube 1 may be made of welded sheet material or of steel, but is preferably formed of a reinforced part 5 which may be made of cast steel and is fitted to the body 6 of the said tube which is built up by welding or riveting. In order to impart to the member 5 the necessary strength so that it might resist the excessive lateral strains resulting from the hard blows of the monkey 7 when building up the plug 8 and driving the tube 1, the invention provides bolts 9 engaging notches 10 having their open sides directed downwardly, said bolts being effective in spacing the walls of the tube apart and preventing damaging thereof.

The preparatory or lining forms or tubes are driven in the following manner:

A tube 1 resting on the soil is set in a vertical or inclined position against a usual ram. After a quantity of concrete is poured onto the bottom of the tube, the concrete is compressed by the blows of the monkey until a concrete plug 8 is obtained whose strong frictional adherence to the walls of the part 5 of the tube 1 is sufficient to drive the latter into the ground to the desired depth, by ramming directly with the monkey 7 upon the plug 8. Furthermore, the plug secures thorough fluid tightness of the lower end of the tube and prevents water, earth and mud from penetrating into said tube.

Side by side with the tube 1 there is driven a second tube 1a similar to the first, the male guide member 2 of the tube 1a engaging the female guide member 3 of the tube 1.

The tube 1 is then raised to the desired height where it is held stationary by means of cables or chains 11.

The plug 8 is expelled by means of the monkey 7 which presses the concrete out of the tube and into the ground underneath the tube 1, so as to compress the ground and form an enlarged base 8a which constitutes a good anchorage for the sheet pile and considerably increases the supporting capacity of the latter.

The enlarged base 8a being built up, the construction of the sheet pile proper is being proceeded with.

To this end, suitable reinforcing members 12 may be placed in position, when the tube 1 is filled up with concrete, said tube being then completely withdrawn, while the monkey is held stationary or caused to ram upon the upper face of the mass of concrete.

It is to be understood that the concreting of the sheet pile, with or without reinforcing, may also be effected by pouring the concrete into the tube in successive charges by raising the tube, every time a new charge of concrete has been introduced, for a distance approximately equal to the height of the newly deposited layer of concrete, and by subsequently ramming the concrete in the ground.

The second sheet pile is then concreted in a manner similar to the first, so that the concrete of the second sheet pile is so to say welded to one side of the concrete of the sheet pile previously finished, thus allowing for the production of a continuous sheet piling provided with an enlarged base extending over the whole length thereof.

These bolts 9 are expelled and left in the ground at the same time as the plug and thus do not interfere with the withdrawal of the tube when the reinforcement 12 made of longitudinal members bound together is placed in position.

In the embodiment shown in Figs. 5 to 7, the lower part 5 of the tube is reinforced by the provision of one or more ribs 13 cast integral therewith. In this instance the tube is driven and the sheet pile is concreted in the manner hereinbefore described. However, in order to allow the concrete to be compressed in the cavities comprised between the rib or ribs 13 and the walls of the part 5 of the tube, use has to be made of a monkey 7a the lower part of which shows one or more transverse grooves 14 adapted to freely engage said ribs.

In the modification shown in Figs. 8 and 9, the tube 20, which is provided with male and female guide members 21 and 22, respectively, rests upon a sinking point 23 of metal or concrete, said point being engaged on a part of its length by the lower end of said tube.

The tube is driven by means of a core 24 provided with a head 25 resting upon the upper edge of the tube 20, so that the blows of the monkey upon head 25 will result in simultaneously driving the tube 20 and the point 23 into the ground.

As a substitute for the point 23 I may provide a tightening plug of fresh concrete e. g. built up in the lower end of the tube.

In the latter case, the ramming of the concrete designed to build up the sheet pile is effected by means of the core 24 which may be arranged either to support the monkey or to be submitted to the blows of the latter.

The fact that the male and female guide members 21 and 22, respectively, are of much greater width than the tube 20, results in producing, at the junction of the sheet piles, of a longitudinal bead or flange of concrete effective in improving the tightness and the resistance of the sheet piling.

As shown in Fig. 10, such beads or flanges may also be obtained in providing at both ends of the tube 20 widened out sections 26, 27 and in making use of a correspondingly shaped sinking point.

When large tubes are driven into a hard ground, their lower ends are subject to distortion. This may be prevented by connecting the two larger walls of the tube by a central rib, or, as shown in Figs. 10, 11, and 12, by providing on the said larger walls of the tube 20, male guide members 28 (Fig. 10) or female guide members 29 (Figs. 11, 12), cooperating with female or male guide members 30 and 31, respectively, provided on core 24.

A similar arrangement may be employed where the driving is effected by directly ramming upon a concrete plug. In the latter instance the guide members 30, 31 will be made integral with the monkey. In this case the initial distance between the walls of the tube may be maintained by means of bolts 32 engaging notches 33 provided in the lower part of the tube 20 and having their open side directed downwards.

Figs. 13 to 18 illustrate three ways of carrying out the method of driving a tube of square section by causing the monkey impacts to act directly upon a concrete plug formed in a tube, of circular section, thus working in particularly favourable conditions.

In the instance illustrated in Figs. 13 and 14, the hollow preparatory form consists of an outer tube of square section 34 and an inner tube of circular section 35, said tubes being connected to each other at their lower ends by means of a collar 36 having a square outer shape and a circular inner shape. At the lower part of the collar the inner opening thereof is widened out downwardly and is so formed as to show in its lowermost end a square cross section, thus constituting a cutting surface of relatively small area. Holes 37 are provided in the body of the collar comprised between the tube 35 of circular section and the angles of the tube 34 of square section, said holes allowing for the insertion of bars 38 constituting the reinforcement, said bars being anchored in the concrete plug 39 acting as a sinking point.

After the preparatory tube is driven to the desired depth by ramming directly upon the plug 39, a reinforcement member may be placed inside of the tube 35, when the plug 39 is expelled and the sheet pile concreted in the manner described above, the bars 38 remaining anchored in said plug.

According to a modification, the outer tube 34 and the inner tube 35 may have their lower ends substantially flush with each other and may rest upon a concrete sinking point prepared in advance, the concrete plug 39 (Figs. 15 and 16) being formed above said point. The reinforcement bars 38 are anchored in the point 40 and retained therein by means of binding members 41.

Finally, according to another modification, the inner tube 35 may be dispensed with, and, as a substitute therefor, I may use the wall of the inner opening of the collar 36, which, in this instance, is fastened to the square tube 34 and extended upwards inside the latter to a convenient height (Figs. 17–18).

In the various modifications, the driving is carried out in the manner described in reference to Figs. 13 and 14.

In order to enable the construction of sheet pilings having smooth walls, my invention provides preparatory tubes furnished with guide members worked in the thickness of the body of the tubes.

Four sections of guide members are shown in Fig. 19, viz. $a$, $b$, $c$, and $d$. It is to be understood that such guide members may be used with preparatory forms of square, rectangular or other shape.

What I claim is:

1. A preparatory caisson for constructing concrete sheet piles moulded in the ground, having external means to interlock with adjacent caissons and reinforcing means at the lower end of the tube to rigidly connect to each other the opposite walls of the caisson and prevent distortion of the latter under the driving action on the concrete.

2. A preparatory caisson according to claim 1, comprising a metallic reinforcing section rigidly connected to the lower end of the caisson and provided with internal transverse stiffening ribs.

3. A preparatory caisson according to claim 1, comprising notches in the lower edge of the caisson, transverse bracing members in said notches and bridging the space within the caisson, with the notches formed to permit the expulsion of the bracing members under the driving of the concrete through the caisson.

4. A preparatory tube for constructing a concrete sheet pile moulded in the ground, including a receiving tube having external means to interlock with adjacent tubes, and a metallic reinforcing section at the lower end of the tube to prevent distortion of the tube under the driving action on the concrete, the reinforcing section being formed in its lower edge with notches, rods in said notches and bridging the space within the reinforcing section, with the notches formed to permit displacement of the rods under the driving action of the concrete through the tube, whereby the rods are embedded within the concrete as a transverse reinforce therefor.

5. A preparatory caisson according to claim 1, wherein the caisson is formed as a rectangular outer section and a circular inner section, and a connecting part at the lower ends of the sections exteriorly conforming to the outer section and interiorly conforming to the inner section.

6. A preparatory caisson according to claim 1, wherein the caisson is formed as a rectangular tube having at its lower end an internal collar showing an inner bore of circular cross section.

EDGARD FRANKIGNOUL.